Feb. 7, 1967   E. C. FICHTNER   3,302,632
MICROWAVE COOKING UTENSIL
Filed Dec. 6, 1963

INVENTOR.
EDWARD C. FICHTNER
BY
*Naylor & Neal*
ATTORNEYS

United States Patent Office 3,302,632
Patented Feb. 7, 1967

3,302,632
MICROWAVE COOKING UTENSIL
Edward C. Fichtner, Burlingame, Calif., assignor to Wells Manufacturing Company, San Francisco, Calif., a corporation of California
Filed Dec. 6, 1963, Ser. No. 328,595
9 Claims. (Cl. 126—390)

The present invention relates to cooking utensils and more particularly to cooking utensils wherein the food contained thereon is rapidly heated by microwave energy.

In the past, various devices have been used to heat precooked and/or uncooked frozen food in a relatively short period of time and to control the heating rate of such food. Control over the rate of heating is especially important when more than one type of food is on the cooking utensil and the various foods heat at different rates. As a typical example, a vegetable or vegetable sauce would be more lossy and hence require less time to heat or reheat than a serving of meat. Without a control over the rate of heating one portion of the food on the heating tray could be ready for consumption while another portion would still need cooking or one portion would be satisfactory but another portion would be overdone or even burnt. Some attempts have been made to control uneven cooking but have been relatively impractical.

For instance, one device known in the art utilizes dielectric means, usually in the form of blocks, which are placed under the food containing tray to space the food away from the oven walls and concentrate the microwaves in the center of the food being cooked. The dielectric means are of various sizes to concentrate varying degrees of microwave energy in the different food masses being cooked. This method of heat regulation involves the use of an unsightly and cumbersome object used with the food tray as well as the needless changing of blocks to conform to the types of food being heated.

In accordance with this invention, uniform cooking of different foods to make them all done at the same time is accomplished by providing a cooking utensil the walls of which regulate microwave transmission to the food so that more lossy foods located in predetermined areas of the utensil receive less transmitted microwave energy.

The primary object of this invention is to provide a new and improved microwave cooking utensil.

Another object of the invention is to provide such a cooking utensil which is relatively simple in design and construction.

Another object is to provide a microwave cooking utensil having the heating regulating means integral therein.

A further object of the invention is to provide a structure of the character described capable of selectively heating the various foods contained therein and selectively heating such foods both by microwave absorption and by thermal conduction.

It is another object of the invention to provide a microwave cooking utensil which may be employed as the storage container, cooking utensil and serving plate for pre-prepared meals such as TV dinners.

Other features, objects and advantages of the present invention will be apparent from the following description of certain embodiments illustrated in the accompanying drawing in which.

Figure 1:
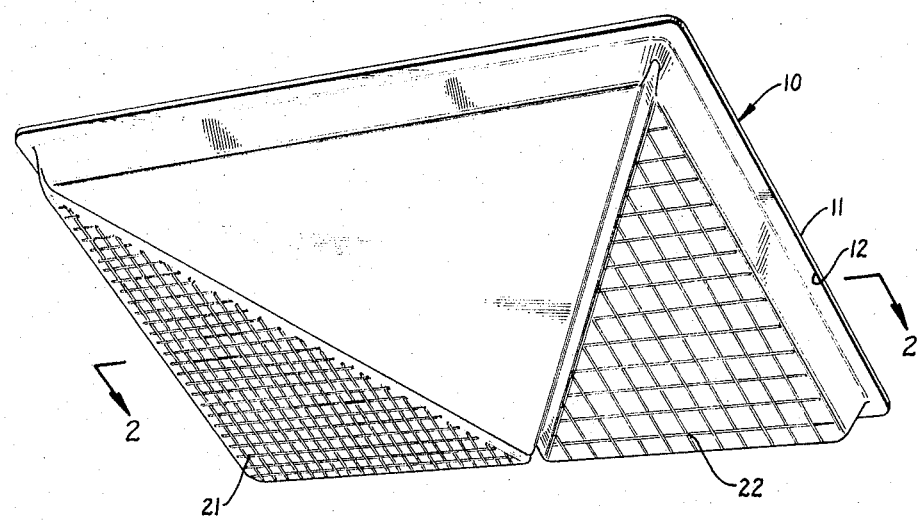
FIG. 1 is a perspective view of a microwave cooking utensil having a grid of metal wires under one section, a second grid of wires of different mesh size under a second section and a third section with no wires.
Figure 2:
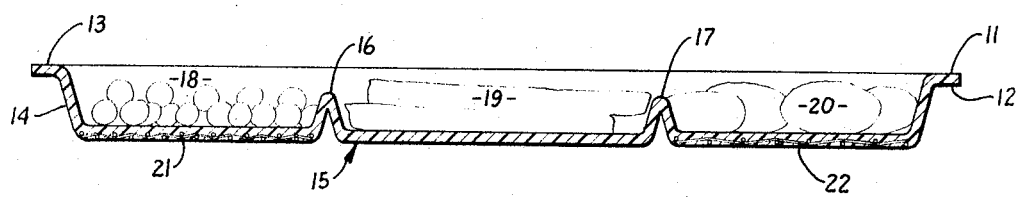
FIG. 2 is a section taken substantially along the line 2—2 of FIG. 1 showing the metallic grids in the base of the utensil.

Referring particularly to FIGS. 1 and 2, there is shown a microwave cooking utensil, generally designated 10. The utensil is primarily rectangular in shape and is similar in outer appearance to devices already on the market known as TV dinners in which frozen food is heated in a regular oven.

The utensil 10 may be formed as a single body of plastic material or as a laminated body in which a first plastic vessel 11 and a subjacent plastic vessel 12 are adhesively secured together thereby forming a lip portion 13, on which a protective and/or insulating cover may be placed if desired, a side portion 14 and a base portion generally designated 15. The vessels 11 and 12 are made of a low loss material such as polystyrene. Indentations 16 and 17 form a plurality of compartments in the base portion 15 to keep separate any food which may be placed thereon. For identification purposes these compartments are numbered 18, 19 and 20 with compartment 19 being somewhat larger than the two other compartments.

Grids 21 and 22 of different mesh are incorporated into the base portion 15 of utensil 10 by being sandwiched between or embedded within the two nested and adhesively secured together plastic vessels 11 and 12. The shields or grids 21 and 22 are constructed of a high conductivity metal which dampens microwaves originating from an appropriate source (not shown) and directed through the utensil. The grids 21 and 22 reduce the transmission of microwaves through the vessel walls and hence slow up the cooking process. As is apparent hereinafter, the grids 21 may be replaced by similar quantities of high loss material which not only reduces transmission of microwave energy into the compartments but also heat up to cook the foods on the hot surfaces of the plate.

As shown in FIG. 2, the thick grid 21 or the grid with the small mesh size is under compartment 18 which contains peas, the open-spaced or large mesh size grid 22 is under compartment 20 which contains potatoes, and compartment 19 does not have a grid or shield under it and contains meat. Thus, microwaves are transmitted to the three compartments to cook the three different foods to a done condition in the same time interval.

By having the right size mesh under compartments 18 and 20 based upon the amount of time necessary to cook the meat in compartment 19 it is possible to carry on simultaneously the selective cooking of a plurality of different food masses which each absorb microwave energy at a different rate so that all the food masses end up being ready for human consumption at the same moment. Of course it should be understood that foods other than meat, potatoes and peas can be used with the same result being accomplished.

Figure 3:
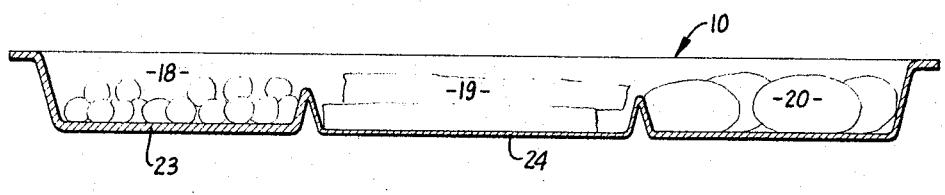
FIG. 3 is a section similar to FIG. 2 showing a utensil of this invention made of a homogeneous material.

Another embodiment of the invention is illustrated in FIGURE 3. Here the microwave cooking utensil 10 is made of a homogeneous material of high loss composition, and the wall portions of the different compartments are made with different thicknesses. Thus, wall 23 under compartment 18 is thicker than wall 24 under compartment 19, and these lossy walls of different thickness provide balances between microwave and conduction cooking for the different foods. The food in compartment 19 is cooked primarily by absorbed microwaves and partially by heat conducted from the wall 24 while the reverse is true in cavity 18.

Figure 4:
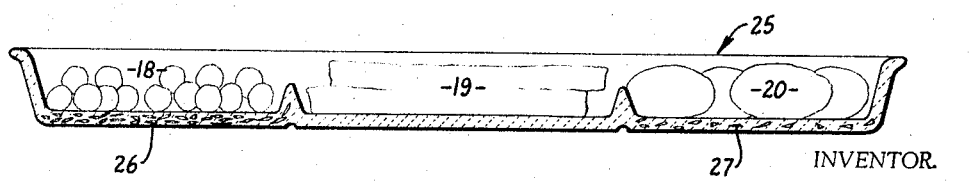
FIG. 4 is a section similar to FIG. 2 showing different densities of metallic particles in the base of a ceramic dish.

FIG. 4 shows a dish, generally designated 25, of ceramic material or the like similar to the plastic utensils of FIG. 1 having a large quantity of metallic particles 26 embedded under compartment 18 and a small quantity of metallic particles 27 embedded under compartment 20. The dish 25 functions in the same manner as the utensil 10.

The foregoing detailed description has been given for clearness of understanding only, and no unnecessary limitations should be understood therefrom, for some modifications will be obvious to those skilled in the art.

I claim:

1. A microwave cooking utensil comprising: a vessel having a plurality of different paths therethrough for the transmission of microwave energy, a plurality of different cooking areas in said vessel adapted to contain different foods with each of said different cooking areas positioned in a different one of said paths outside of the other paths, said vessel having walls with a different wall portion positioned in each of said paths outside of the other paths, said wall portions being positioned with respect to each other to provide said different paths for transmission of microwave energy through said utensil; and a microwave regulating material embedded in said walls for altering the microwave conductivity of said walls while permitting microwave transmission through said walls with said regulating material distributed in a greater concentration in one of said wall portions than in another wall portion for providing different microwave cooking rates in the cooking areas adjacent thereto.

2. A microwave cooking utensil comprising: a vessel having first and second wall portions positioned side by side and defining first and second compartments positioned side by side on the same side of said wall portions with said compartments adapted to contain different foods with said wall portions being formed of an electrical insulating material which transmits microwave energy, and with said wall portions being positioned with respect to each other to provide different paths for transmission of microwave energy through said utensil; and a microwave regulating material embedded in said vessel for retarding microwave transmission through said vessel while permitting microwave transmission through said vessel with said regulating material embedded in said first wall portion in a greater concentration than in said second wall portion for providing different microwave cooking rates in said first and second compartments.

3. A microwave cooking utensil comprising: a vessel having first and second wall portions positioned side by side and defining first and second compartments positioned side by side on the same side of said wall portions with said compartments adapted to contain different foods with said wall portions being formed of an electrical insulating material which transmits microwave energy, and a quantity of lossy material which absorbs microwave energy at a greater rate than does said insulating material embedded in said insulating material with said lossy material embedded in said first wall portion in a greater concentration than in said second wall portion for providing a lower microwave cooking rate in said first compartment than in said second compartment while providing wall surfaces of said first compartment which are hotter than the wall surfaces of said second compartment.

4. A microwave cooking utensil comprising: a vessel having first and second wall portions positioned side by side and defining first and second compartments positioned side by side on the same side of said wall portions with said compartments adapted to contain different foods with said wall portions being formed of an electrical insulating material which transmits microwave energy, and a quantity of metal embedded in said insulating material with said metal embedded in said first wall portion in a greater concentration than in said second wall portion for providing a lower microwave cooking rate in said first compartment than in said second compartment.

5. The cooking utensil of claim 4 in which said quantity of metal is arranged in the form of a grid of metal wires embedded in said first wall portion.

6. The cooking utensil of claim 4 in which said quantity of metal is arranged in the form of a plurality of metal particles embedded in said first wall portion.

7. A microwave cooking utensil comprising: a vessel having first and second microwave transmission paths therethrough, first and second compartments in said vessel in said first and second paths respectively and adapted to contain different foods with said vessel having respective first and second wall portions in each of said first and second paths outside of the other path with said first and second wall portions being positioned with respect to each other to provide said different paths for transmission of microwave energy through said utensil, and with said portions constructed to regulate the transmission of microwave energy therethrough at different rates for cooking different foods in said compartments at different rates.

8. A microwave cooking utensil comprising: a vessel having a plurality of different paths therethrough for the transmission of microwave energy, a plurality of different cooking areas in said vessel adapted to contain different foods with each of said different cooking areas positioned in a different one of said paths outside of the other paths, said vessel having walls with a different wall portion positioned in each of said paths outside of the other paths, and a metal microwave regulating material embedded in said walls for altering the microwave conductivity of said walls while permitting microwave transmission through said walls with said regulating material distributed in a greater concentration in one of said wall portions than in another wall portion for providing different microwave cooking rates in the cooking areas adjacent thereto.

9. A microwave cooking utensil comprising: a vessel having a plurality of different paths therethrough for the transmission of microwave energy, a plurality of different cooking areas in said vessel adapted to contain different foods with each of said different cooking areas positioned in a different one of said paths outside of the other paths, said vessel having walls with a different wall portion positioned in each of said paths outside of the other paths, and a lossy microwave regulating material embedded in said walls for altering the microwave conductivity of said walls while permitting microwave transmission through said walls with said regulating material distributed in a greater concentration in one of said wall portions than in another wall portion for providing different microwave cooking rates in the cooking areas adjacent thereto.

References Cited by the Examiner

UNITED STATES PATENTS

| | | | |
|---|---|---|---|
| 1,522,329 | 1/1925 | Salucci | 126—390 X |
| 2,581,161 | 1/1952 | Anderson | 126—390 |
| 2,612,596 | 9/1952 | Gross | 219—10.55 |
| 2,714,070 | 7/1955 | Welch | 219—10.55 X |
| 2,738,406 | 3/1956 | Zaleski | 219—10.55 X |
| 2,748,239 | 5/1956 | Long et al. | 219—10.55 |
| 2,830,162 | 4/1958 | Copson et al. | 219—10.55 X |
| 2,993,973 | 7/1961 | Johnson et al. | 219—10.55 |
| 3,079,912 | 3/1963 | Griem | 126—390 |
| 3,083,528 | 4/1963 | Brown | 219—10.55 X |
| 3,179,780 | 4/1965 | Verstraten | 219—10.55 |

A. LOUIS MONACELL, *Primary Examiner.*

ROBERT A. DUA, *Examiner.*

L. M. SHAPIRO, *Assistant Examiner.*